Patented June 22, 1926.

1,589,599

UNITED STATES PATENT OFFICE.

MORRIS SELIG KHARASCH, OF COLLEGE PARK, MARYLAND.

WATER SOLUBLE METALLIC ORGANIC COMPOUND AND PROCESS OF MAKING THE SAME.

No Drawing.    Application filed April 24, 1924. Serial No. 708,807.   REISSUED

The present invention relates to the production of water soluble organo-metallic compounds, and particularly of such compounds in which the metal is bonded to a carbon atom and is of that group of metals, including mercury, arsenic, antimony and bismuth, which, having a valence greater than 1, form stable organo-metallic compounds with the metal bonded to a carbon atom.

The invention is of particular importance in connection with the organic compounds having germicidal or therapeutic value, such as compounds of mercury, arsenic, antimony, bismuth and the like, the efficiency of which have hitherto been greatly limited by the difficulty of producing readily soluble compounds.

In carrying out the process of my invention I react upon an organo-metallic compound with a water soluble compound containing the thio-hydroxyl group (SH), of which the mercaptans are the simplest examples. Thus I may use thioalcohols such as ethyl mercaptan, thioglycerine or thioglycol, or their carboxylic or sulfonic compounds, such as thioglycolic acid, thiolactic acid, thiomalic acid, thiosalicylic acid, etc.; thiophenols, such as thioresorcinol, thionaphthol and like products.

A typical formula for the organo-metallic compounds is as follows: R—Hg—$x$ in which R is any organic radical having the Hg attached to a carbon atom and in which $x$ is any replaceable inorganic radical or group. Hg can be replaced by any metal having a valence greater than one which will form organo-metallic compounds with the metal bonded to a carbon atom and which compounds are stable toward water. These metals are in general those lying lower than hydrogen in the electromotive series.

The following specific examples illustrate the invention:

*Example 1.*

Phenyl mercury chloride, $C_6H_5HgCl$, is treated with potassium thio-glycollate, $HSCH_2$—COOK. The potassium thioglycollate, which is water soluble, is first dissolved in water, preferably as a concentrated solution. The phenyl mercury chloride is then added to the solution in about the proportion of one mol of the latter to one and one-quarter mols of potassium thioglycollate in solution. The mixture is gently warmed, preferably with agitation, and the mercury compound passes readily into solution, apparently as the compound having the formula

$C_6H_5Hg$—S—$CH_2$—COOK.

The following reaction takes place

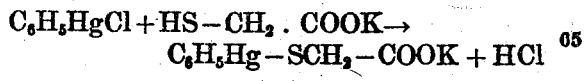

$C_6H_5HgCl + HS-CH_2 . COOK \rightarrow$
$C_6H_5Hg-SCH_2-COOK + HCl$

To neutralize the hydrochloric acid resulting from the above reaction the requisite amount of sodium bicarbonate, $NaHCO_3$ may be added to the solution. To purify the product thus formed, hydrochloric acid or any other acid may be added. A white precipitate is formed which is

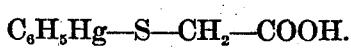

$C_6H_5Hg$—S—$CH_2$—COOH.

This substance melts, with decomposition, at 164° C. This may be collected on a filter, washed well with water to remove any inorganic salts, dried in a dessicator and then dissolved in the calculated amount of sodium or potassium hydroxide and the whole poured into 95% alcohol. The salt

$C_6H_5Hg$—S—$CH_2$—COOK(Na)

separates and is collected on a filter. This salt is water-soluble.

*Example 2.*

To a concentrated water solution containing 0.1 mole of the sodium salt of thiosalicylic acid, the equivalent amount of phenyl mercuric chloride is added and the whole heated for 15 minutes, when the phenyl mercuric chloride goes into solution in the form of

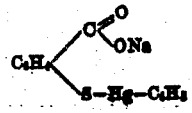

The addition of a small amount of sodium carbonate is quite beneficial for it neutralizes the hydrochloric acid formed in the reaction.

The compound thus obtained, namely

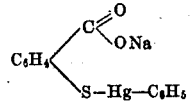

may be purified by treating the water solution with an acid. A compound

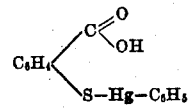

separates which can be collected on a filter and washed free from all impurities. The precipitate can then be dissolved in the calculated amount of a sodium hydroxide solution and the latter poured into 95% alcohol. The product

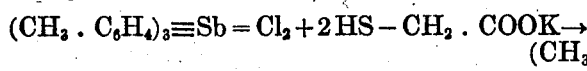

The alcoholic solution is then evaporated to dryness in vacuo. The residue is treated with water and then a small amount of acetic acid is added. The precipitate thus obtained is washed well with water and collected on the filter and then dissolved in the concentrated solution of one equivalent of sodium hydroxide and the whole poured into a mixture of alcohol and ether. The following salt separates:

$$(CH_3 . C_6H_4)_3 \equiv Sb = (S - CH_2 . COONa)_2$$

The compond thus obtained is soluble in water, insoluble in alcohol ether mixture, insoluble in benzene and other common organic solvents. Upon boiling for a long time in water the solution is broken down. It has no melting point.

Example 4.

To an alcoholic solution of phenyl arsenious chloride an equivalent amount of the potassium salt of thioglycollic acid is added and the whole warmed for about five minutes on a water bath. The following compound is produced:

The compound can be purified in exactly the same manner as outlined in case of the antimony compound given in Example 3, namely the formation of the free acid and the later preparation of the salt. It has no definite physical characteristics.

It is insoluble in most organic solvents; has no definite melting point and decomposes upon long boiling in water solution or with mineral acids.

Minor changes may be made in the steps

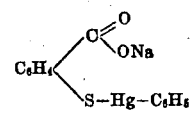

separates. This product is water soluble.

The salt has no melting point and is insoluble in ether, alcohol, and other organic solvents. When cooled for a long period of time, particularly in concentrated solution, mercuric sulfide separates. The free acid of this salt may be obtained by the addition of any strong acid.

Example 3.

To an alcoholic solution of p-tolyl antimony chloride the equivalent amount of sodium or potassium salt of thioglycollic acid is added and the whole warmed for five minutes on a water bath. The following compound is produced:

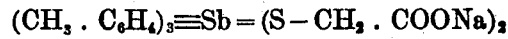

of the process within the scope of the appended claims without departing from the spirit of the invention.

I claim:

1. The process of producing water soluble metallo-organic compounds which comprises treating with a solution of an organic compound containing a thio-hydroxyl group a compound of the formula R—M—$x$ in which R is any organic radical having the metal attached to a carbon atom, in which $x$ is any replaceable inorganic radical or group, and in which M is any metal having a valence greater than one which will form organo-metallic compounds with the metal bonded to a carbon atom, stable toward water.

2. The method of producing a water soluble metallo-organic compound which comprises treating with a solution of a salt of an organic thio-hydroxyl compound containing an acid group of the formula R—M—$x$ in which R is any organic radical having the metal attached to a carbon atom, in which $x$ is any replaceable inorganic radical or group, and in which M is any metal having a valence greater than one which will form organo-metallic compounds with the metal bonded to a carbon atom, stable toward water.

3. The method of producing a water soluble metallo-organic compound which comprises treating an organo mercuric compound having the formula R—Hg—$x$ in which R is any organic radical having the Hg attached to a carbon atom in which $x$ is any replaceable inorganic radical or group with a solution of an organic thiohydroxyl compound.

4. The method of producing a water soluble metallo-organic compound which comprises treating an organo mercuric compound having the formula R—Hg—$x$ in which R is any organic radical having the Hg attached to a carbon atom in which $x$ is any replaceable inorganic radical or group with an alkaline solution of a thio-hydroxyl organic acid.

5. A water soluble salt of the following acid R—Hg.S.CH$_2$COOH in which R is an organic radical having the mercury directly attached to a carbon atom.

6. A water soluble salt of a compound of the following general formula

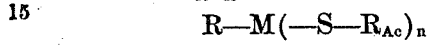

in which R is any organic radical group, R$_{Ac}$ is an organic radical containing an acid group, M is a metal of a group forming compounds stable toward water with the metal bonded to a carbon atom of an organic group and having valence greater than 1, and $n$ is an integer greater than 0 and at least one less than the valence of the metal, the metal and the sulphur in the compound being bonded to the carbon atoms of the groups R and R$_{Ac}$ respectively.

7. A water soluble salt of a compound of mercury of the following general formula R—Hg—S—R$_{Ac}$ in which R is any aromatic or aliphatic group, R$_{Ac}$ is an organic radical containing an acid group, the Hg and S atoms being bonded to carbon atoms of the R group and R$_{Ac}$ group respectively.

8. The process of producing a water soluble mercuri-organic compound which comprises treating an organic compound of mercury of the formula R—Hg—$x$ in which R is any organic radical having the mercury attached to a carbon atom and in which $x$ is any replaceable radical or group with a water solution of an alkali metal salt of thio-glycolic acid.

9. The process of producing a water soluble mercury organic compound which comprises treating phenyl mercuric chloride with a water solution of an alkali metal salt of thio-glycolic acid.

MORRIS SELIG KHARASCH.